United States Patent
Gouchi et al.

(10) Patent No.: US 6,774,159 B2
(45) Date of Patent: Aug. 10, 2004

(54) COMPOSITION PRESENTING HIGH RESISTANCE TO THE PROPAGATION OF FIRE

(75) Inventors: Aziza Gouchi, Marcoussis (FR); Agnes Durin-France, Nimes (FR); Francoise Ducatel, Bonnelles (FR); Jose-Marie Lopez-Cuesta, St. Christol les Ales (FR); Laurent Ferry, Saint Dezery (FR)

(73) Assignee: Nexans (FR)

( * ) Notice: Subject to any disclaimer, the term of this patent is extended or adjusted under 35 U.S.C. 154(b) by 0 days.

(21) Appl. No.: 10/210,893

(22) Filed: Aug. 1, 2002

(65) Prior Publication Data

US 2003/0134941 A1 Jul. 17, 2003

(30) Foreign Application Priority Data

Aug. 7, 2001 (FR) .............................. 01 10778

(51) Int. Cl.⁷ .......................... C08K 9/04; C08K 9/12; C08K 3/26
(52) U.S. Cl. ....................... 523/200; 523/210; 524/425; 524/426; 524/427
(58) Field of Search .............................. 523/200, 210; 524/425, 426, 427

(56) References Cited

U.S. PATENT DOCUMENTS

| | | | |
|---|---|---|---|
| 4,083,789 A | 4/1978 | Morgan et al. ............. 252/8.1 |
| 4,221,771 A | * 9/1980 | van der Heem ......... 423/420.2 |
| 5,266,618 A | * 11/1993 | Watanabe et al. ............ 524/405 |
| 5,461,101 A | * 10/1995 | Rothon et al. .............. 524/436 |
| 6,555,605 B1 | * 4/2003 | Casiraghi .................... 524/126 |

FOREIGN PATENT DOCUMENTS

| EP | 10393813 | 10/1990 |
|---|---|---|
| EP | 1000981 | 5/2000 |

OTHER PUBLICATIONS

Gilman, Jeffrey W., et al. "Fire Retardant Additives for Polmeric Materials —I. Char Formation from Silica Gel —Potassium Carbonate." in "Thirteenth Meeting of the UJNR Panel on Fire Research and Safety, Mar. 13–20, 1996 vol. 2," (NIST), pp 261–270.*

* cited by examiner

*Primary Examiner*—Matthew A. Thexton
(74) *Attorney, Agent, or Firm*—Sofer & Haroun, LLP

(57) ABSTRACT

The present invention provides a composition possessing high resistance to fire propagation, the composition comprising a base polymer and a fireproofing additive containing a metal hydroxide. In the composition, said fireproofing additive further contains a compound based on a carbonate of a metal from group IA of the periodic table of elements coated in a metal salt, said compound constituting at least 10% by weight of fireproofing additive.

7 Claims, No Drawings

COMPOSITION PRESENTING HIGH RESISTANCE TO THE PROPAGATION OF FIRE

The present invention relates to a composition presenting a high resistance to the propagation of fire, and intended particularly but not exclusively to manufacturing electrical and/or optical cables for conveying power and/or transmitting information, which cables are required to withstand the high temperatures of a fire for a certain length of time.

BACKGROUND OF THE INVENTION

The materials used as insulating and/or protecting coverings for cables that are resistant to the propagation of fire are conventionally made fireproof by incorporating a fire-retarding system in the polymer or the copolymer on which the covering is based.

Known fire-retarding systems are based in particular on:
halogen derivatives;
metal hydroxides, in particular magnesium hydroxide $Mg(OH)_2$ and alumina trihydrate $Al(OH)_3$; and
silicone, magnesium stearate, and calcium carbonate $CaCO_3$, as described in document EP-0 774 487.

At present, the use of halogen derivatives is becoming less common because of the toxic and corrosive fumes they give off during combustion.

With systems using a combination of silicone, magnesium stearate, and calcium carbonate, the metal salt (magnesium stearate) migrates towards the surface of the base material in the event of a fire and decomposes, giving rise to an inorganic residue that reinforces the inorganic barrier of calcium silicate formed on the surface of the base material by the silicone and the filler of calcium carbonate. Nevertheless, those materials do not form ash that is sufficiently compact in the event of a fire. As a result the residue is friable, and therefore less effective. Fire protection remains limited and therefore does not comply with all standards.

Finally, although systems using metal hydroxides present acceptable fire resistance, they are nevertheless not suitable in all applications. Metal hydroxides must constitute a large fraction (at least 60% by weight) of the composition in which they are incorporated in order to obtain good resistance to fire. As a result, the viscosity of compositions containing such hydroxides as fireproofing additives is increased, thereby reducing the rate at which they can be extruded and consequently reducing the speed at which cables making use of them can be produced. Forming is therefore lengthier, and manufacturing costs are higher.

In addition, the high concentration of metal hydroxide, and in particular of alumina trihydrate, in compositions for use in making electrical cables degrades electrical insulation so that such compositions are usable only as the protective covering of electrical cables and not as the insulating covering of their conductors.

In addition, a high concentration of metal hydroxides degrades the mechanical properties of the compositions in which the hydroxides are incorporated.

OBJECT AND SUMMARY OF THE INVENTION

The object of the present invention is thus to develop a fire-retarding composition suitable for being used as a protective sheath for cables without penalizing the manufacturing process and without penalizing the mechanical characteristics of such cables, and having an oxygen limit index (OLI) of 35%, typically at least as good as that of fire-resistant compositions based on metal hydroxides, and having fire-withstanding properties that are better than those of prior art compositions.

To this end, the present invention provides a composition possessing high resistance to fire propagation, the composition comprising a base polymer and a fireproofing additive containing a metal hydroxide,
wherein said fireproofing additive further contains a compound based on a carbonate of a metal from group IA of the periodic table of elements coated in a metal salt, said compound constituting at least 10% by weight of fireproofing additive.

The invention relies on using a material complying with a known type of fireproofing mechanism, i.e. a mechanism based on using metal hydroxides, and on incorporating in said material additives that are not intrinsically fireproofing but that act in synergy with the metal hydroxide and lead to an improvement in the mechanical characteristics of the final material and also to an improvement in the method of manufacturing cables having a sheath made of such a material. In addition, the fireproofing properties of materials obtained in this way are also improved.

In the invention, at least 10% of fireproofing additive is constituted by the compound based on a metal carbonate, such that the quantity of metal hydroxide in the composition is correspondingly reduced.

As a result, problems associated with the use of metal hydroxides are limited, and in particular degraded mechanical performance of the composition and increased viscosity thereof.

More precisely, the use of a flux (metal carbonate) makes it possible to limit the increase in viscosity while working the composition of the invention. The flux thus makes it possible to reduce the torque measured during the method by 14% to 22%.

More precisely, the metal carbonate serves initially as a flux (thereby reducing the viscosity of the composition), and subsequently, after being degraded in a fire, it serves to release both a metal oxide that reinforces the residue, and also to form a metal silicate from the inorganic filler, thereby improving the cohesion and the rigidity of the residue.

In addition, treating the metal carbonate with a metal salt makes it possible to reduce the hygrometry of the carbonate, thus improving shaping conditions.

Most advantageously, the compound further contains an inorganic filler that is porous or flaky.

The ternary metal hydroxide/inorganic filler/metal carbonate system treated by a metal salt serves to reinforce cohesion of the surface layer formed at the surface of the composition in the event of a fire by forming a residue that is vitreous on the outside but porous on the inside, such that the ability of the composition to withstand flame propagation is increased.

Advantageously, the inorganic filler may be selected from silica, talc, mica, graphite, and silica gel.

Also advantageously, the carbonate of a metal from group IA is potassium carbonate.

In an embodiment of the invention, the base polymer is an ethylene-vinyl acetate copolymer (EVA).

Other possible base polymers that may be used in the invention comprise in particular: polyethylene, polypropylene and copolymers thereof, silicones, elastomers, and thermoplastic elastomers. Suitable ethylene copolymers include: ethylene-vinyl acetate copolymers, ethylene-acrylic acid copolymers, ethylene-propylene copolymers, and ethylene-alkyl acrylate copolymers. It is preferable to select a thermoplastic polymer and ethylene-vinyl acetate copolymer.

A preferred metal hydroxide for use in the invention is magnesium hydroxide $Mg(OH)_2$. While it is being degraded, this composition releases about one-third of its weight as water, thereby locally cooling the medium, and then it forms a protective ceramized layer of metal oxide.

It is also possible to use alumina trihydrate $Al(OH)_3$ as the metal hydroxide in the context of the present invention.

DETAILED DESCRIPTION OF THE INVENTION

Other characteristics and advantages of the present invention appear in the following description of examples of compositions in accordance with the invention given by way of non-limiting illustration.

The invention applies equally well to binary and to ternary fireproofing systems.

In general, a ternary fireproofing system of the invention provides particularly high resistance to flame propagation since the mechanism which it implements leads to a complex assembly of layers that are particularly effective in withstanding fire being formed on the surface of the polymer-based material. This assembly of layers comprises in succession, going from the surface of the base material, and when the filler is silica, $Mg(OH)_2$ metal hydroxide, and $K_2CO_3$ carbonate:

- a layer of charring (i.e. the result of transformation into charcoal by incomplete combustion, also referred to as "carbonization") based on Si—O—C;
- a layer of microporous silica;
- a shell of vitreous silicate (Si—O-metal) surrounding the preceding layers; and
- a ceramic shell of $K_2O$ and MgO outside the vitreous silicate shell.

When a composition of the invention is degraded under the effect of a flame, the following are formed:

- an inorganic residue (microporous silica) that withstands fire and is suitable for controlling decomposition rate by trapping gases and protecting the base material from the effect of high temperature and from continued combustion;
- charring that serves to provide good cohesion between the base material and the inorganic residue;
- a ceramic covering on the surface of the inorganic residue serving to reinforce it; and
- a vitreous lattice beneath the ceramic covering to improve its cohesion and to reinforce the barrier effect.

Examples I to III below give compositions in accordance with the invention. Example IV is a comparative example using a prior art composition based on magnesium hydroxide $Mg(OH)_2$ alone as the fireproofing additive. Example I corresponds to a binary system in accordance with the invention, while Examples II and III corresponding to ternary systems in accordance with the invention.

Example I

Ethylene-vinyl acetate: 40% by weight.

Magnesium hydroxide $Mg(OH)_2$: 45% by weight.

Potassium carbonate $K_2CO_3$ treated with magnesium stearate: 15% by weight.

Example II

Ethylene-vinyl acetate: 40% by weight.

Magnesium hydroxide $Mg(OH)_2$: 45% by weight.

Potassium carbonate $K_2CO_3$ treated with magnesium stearate: 7.5% by weight.

Talc: 7.5% by weight.

Example III

Ethylene-vinyl acetate: 40% by weight.

Magnesium hydroxide $Mg(OH)_2$: 45% by weight.

Potassium carbonate $K_2CO_3$ treated with magnesium stearate: 12% by weight.

Silica $SiO_2$: 3% by weight.

Example IV

Ethylene vinyl acetate: 40% by weight.

Magnesium hydroxide $Mg(OH)_2$: 60% by weight.

The compositions of Examples I to IV were subjected to the so-called "drop" test. This test is applicable to so-called "fusible" materials, i.e. to materials that present phenomena of melting accompanied by drops falling during a previously-performed radiation test, and it reveals the presence of burning droplets. It is governed by French standard NFP 92-505.

The test consists in subjecting a sample to constant hot radiation and possibly causing the gas given off to catch fire and drops to fall, which drops may optionally be burning. The source of heat is constituted by a sealed infrared radiator which is placed above the sample under test. As soon as the sample catches fire the radiator is moved away and then replaced over the sample when it goes out. This operation is repeated for a minimum duration of 5 minutes.

The test serves to obtain the following quantitative items concerning the samples under test:

- mean time to first ignition;
- mean duration of burning;
- maximum duration of burning;
- total accumulated burning time;
- number of burns;
- lighting time.

The table below gives the quantitative values of the various above-mentioned parameters together with the OLI for the compositions of Examples I to IV.

|  | Composition | | | |
| --- | --- | --- | --- | --- |
|  | I | II | III | IV |
| Ignition time(s) | 56 | 56 | 56 | 78.5 |
| Mean burning duration(s) | 7.21 | 7.68 | 7.60 | 9.98 |
| Maximum burning duration(s) | 10 | 10.75 | 11.25 | 16.25 |
| Total burning time(s) | 176.75 | 180.25 | 169 | 207 |
| Number of burn(s) | 24.5 | 23.5 | 22.25 | 20.75 |
| Lighting time(s) | 2.74 | 2.71 | 3.37 | 0.70 |
| OLI (%) | 56.8 | 57 | 50 | 48 |

This table shows that ignition time is considerably reduced for compositions of the invention compared with the comparative composition of Example IV.

In addition, compositions of the invention considerably improve the other values given by the test relative to the comparative composition of Example IV.

Thus, the mean and maximum burning durations and the total cumulative burning time are much shorter, thus revealing the flame retarding ability of compositions of the invention and their greater effectiveness at withstanding fire compared with the composition of Example IV. This is due to the synergy effects that occur between the components of systems in accordance with the invention, and also to the improved cohesion of the structure of the final residue.

In addition, the increase in the number of burns in compositions of the invention shows the ability of such compositions to counter burning since they "extinguish" quickly.

In particular, the reduction in the mean duration of burning in compositions of the invention can be explained by the formation of a ceramic solid residue $K_2O$—$MgO$ which isolates the combustible substances from the oxygen in ambient air.

The lighting time, i.e. the length of time to cause the sample to start burning again also reveals high fire-retarding ability in compositions of the invention. Thus, compositions of the invention have a value that is considerably higher than that of the comparative composition of Example IV, which reveals good resistance to burning. This result can be explained, in addition to the formation of a ceramic solid residue $K_2O$—$MgO$ for compositions of the invention, by the formation of a porous lattice in the composition of Example III, which lattice subsequently acts as a trap for the gases given off by combustion, thereby making it possible to limit combustion by depleting the atmosphere of gases that will burn. This lattice is reinforced by a vitreous solid lattice $K_2O$—$SiO_2$ consolidated by $MgO$, and also by the formation of a mass transfer barrier, i.e. a physical barrier that filters combustion products, and that is thermally insulating, as provided by the particles of talc in the composition of Example II.

Finally, it is observed that compositions of the invention have an OLI that is better than that of the comparative composition of Example IV even though they contain less fireproofing agent $Mg(OH)_2$ (and indeed in compositions I and II of the invention the OLI is much better).

In addition, the "cone calorimetric" test which consists in burning samples in ambient air while subjecting them to external energy radiation at a power density of less than 100 kilowatts per square meter ($kW/m^2$) as imposed by temperature-controlled radiant heating, makes it possible to evaluate any influence of the sample under test on the rate at which heat is given off while it is involved in a fire by measuring the heat flux it gives off (heat flow rate).

Thus, the cone calorimetric test performed on samples of the invention shows that compositions of the invention present low decomposition energy: they give off heat at a rate which is 20% to 45% below that of the composition of Example IV. In addition, a curve plotting the rate at which heat is given off as a function of time for each of the compositions of the invention rises, then has a level portion, and then decreases, which characterizes the formation of a protective layer that is effective.

The composition of Example III also makes it possible to provide better control over the rate at which the material degrades because of the porous silica lattice which is characterized by the curve of heat flow rate being spread out in temperature.

In general, it can be seen that all of the compositions of the invention limit the degradation rate of the materials in which they are included compared with the comparative composition of Example IV.

In addition, the compositions of the invention serve not only to reduce smoke emission by 25% to 51%, but the composition of Example II also limits the total amount of heat given off by 15% via the barrier effect mechanism of the particles of talc.

The invention thus makes it possible to develop compositions presenting very high resistance to the propagation of fire, and in particular having better resistance to the propagation of fire than compositions based on metal hydroxide alone as the fireproofing additive, while nevertheless avoiding the problems of such compositions, namely their high viscosity and their reduced mechanical characteristics.

Mixtures of the invention can be prepared using existing installations, for example twin-screw extruders, and extrusion in the form of an outer sheath or in the form of electrical insulation can be achieved, for example using a conventional extrusion line.

Naturally, the present invention is not limited to the implementations described above and it applies generally to any composition that can be envisaged on the basis of the general indications given in the description of the invention.

In particular the base materials that are suitable for use in compositions of the invention may be homopolymers such as, for example, high or low density polyolefins, in particular polyethylene, polypropylene, polybutylene terephthalate, polyamides, polycarbonates, etc. . . . This list is not limiting and numerous well-known homopolymers, particularly those used in cable making, are suitable for use in the context of the present invention. The base material can also be constituted by a mixture of several homopolymers.

It is possible to add further materials to the base polymer used in compositions of the invention, with such materials serving to improve the compatibility of the base material with the other ingredients of the composition.

Base materials in accordance with the invention can also be copolymers such as those described for example in document EP-0 393 959, or indeed thermoplastic elastomers.

In addition, all compositions of the invention may contain conventional agents of the kind used in compositions that present high resistance to fire propagation, in particular for the purpose of making them easier to fabricate, of slowing down aging and oxidation, etc. Such agents are well known to the person skilled in the art and are therefore not described in greater detail.

What is claimed is:

1. A composition possessing high resistance to fire propagation, the composition comprising a base polymer and a fireproofing additive containing a metal hydroxide, wherein said fireproofing additive further contains a compound based on a carbonate of a metal from group IA of the periodic table of elements coated in a metal salt, said compound constituting at least 10% by weight of fireproofing additive.

2. A composition according to claim 1, wherein said component further contains an inorganic filler that is porous or flaky.

3. A composition according to claim 2, wherein said inorganic filler is selected from silica and talc.

4. A composition according to claim 1, wherein said carbonate of a metal of group IA is potassium carbonate.

5. A composition according to claim 1, wherein said base polymer is an ethylene-vinyl acetate copolymer.

6. A composition according to claim 1, wherein said metal hydroxide is magnesium hydroxide $Mg(OH)_2$.

7. An electrical and/or optical cable, having a sheath made of a composition according to claim 1.

* * * * *